G. W. WOLF.
OPERATING DEVICE FOR SPLIT WHEEL RIMS.
APPLICATION FILED OCT. 9, 1913.
1,111,933.
Patented Sept. 29, 1914.
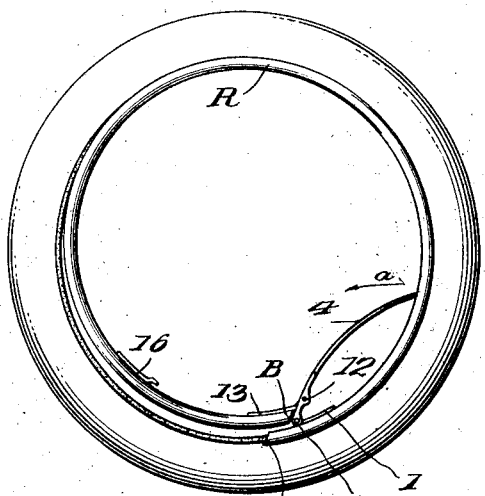
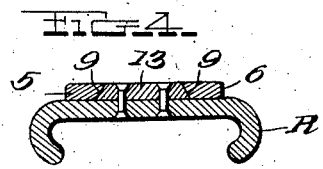
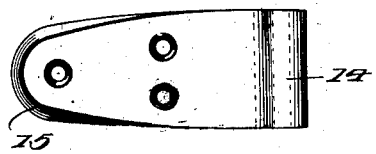
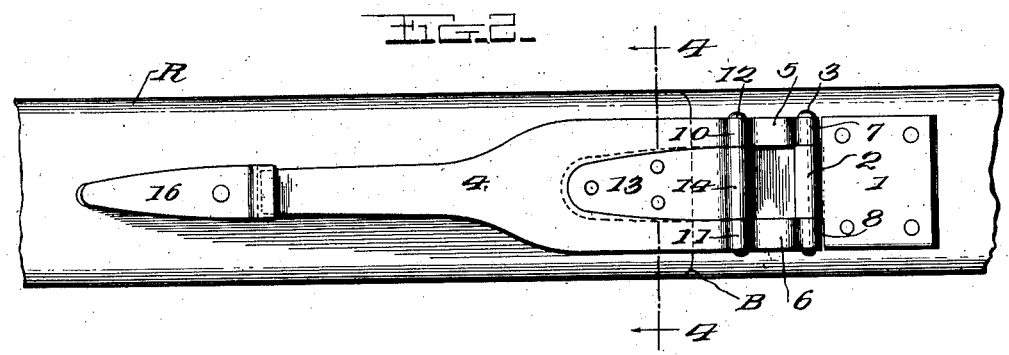
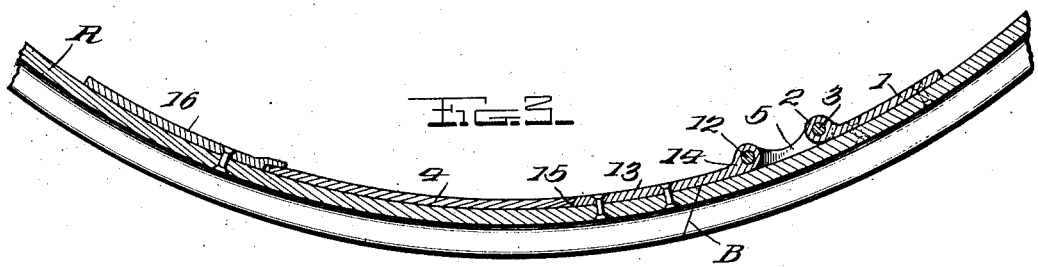
Inventor
George W. Wolf.
Witnesses

UNITED STATES PATENT OFFICE.

GEORGE WESLEY WOLF, OF ROCKFORD, OHIO.

OPERATING DEVICE FOR SPLIT WHEEL-RIMS.

1,111,933. Specification of Letters Patent. Patented Sept. 29, 1914.

Application filed October 9, 1913. Serial No. 794,293.

*To all whom it may concern:*

Be it known that I, GEORGE WESLEY WOLF, a citizen of the United States, residing at Rockford, in the county of Mercer and State of Ohio, have invented certain new and useful Improvements in Operating Devices for Split Wheel-Rims; and I do declare the following to be a full, clear, and exact description of the invention, such as will enable others skilled in the art to which it appertains to make and use the same.

This invention relates to improvements in wheel-rims and particularly to divisible or split rims intended for use in connection with pneumatic tires.

The object of the invention is to provide a simple and efficient device whereby the rim may be readily contracted and expanded and positively locked in its expanded position to provide for the removal and replacement of a tire with great facility.

Another object is to provide a device of this character having means for preventing contortion of the parts should excessive pressure be brought to bear thereon.

With these and other objects in view, the invention consists of certain novel features of construction, combination and arrangement of parts as will be more fully described and claimed.

In the embodiment illustrated: Figure 1 represents a side view of a wheel-rim having a pneumatic tire applied thereto and equipped with this improved device, the rim being shown in open or retracted position; Fig. 2 is a plan view showing this improved operating device applied and in locked position; Fig. 3 is a longitudinal section thereof; Fig. 4 is a transverse section taken on the line 4—4 of Fig. 2; Fig. 5 is a detail plan view of one member of the operating device.

In the embodiment illustrated, a split wheel-rim R is shown the meeting ends of which are preferably beveled in opposite directions as shown at B to adapt them to overlap and form a tight joint when the rim is in operative closed position. The device for contracting or expanding this rim and which constitutes this invention, comprises a plate or hinge member 1 which is adapted to be riveted or otherwise fastened to the inner face of the rim R near one end thereof. This plate 1 has a knuckle 2 designed to receive a pintle 3 which connects said plate with an operating lever 4, said lever being bifurcated and the arms 5 and 6 thereof spaced apart a sufficient distance to receive between the free ends thereof the knuckles 2. The free ends of these arms 5 and 6 have knuckles 7 and 8 thereon through which the pintle 3 passes and connects the lever with the plate 1. The inner edges of these arms 5 and 6 are beveled on their inner faces as shown at 9 the bevel being of greater width at the crotch of the arms and tapering toward the free ends thereof for a purpose to be described. These arms 5 and 6 are also provided with knuckles or bearings 10 and 11 spaced inwardly from the knuckles 7 and 8 and which are designed to receive a pintle 12 which connects the lever with a hinge member 13 which is riveted or otherwise fastened to the other end of the rim R on its inner face. This hinge member 13 is preferably constructed as shown in detail in Fig. 5 in the form of a substantially rectangular plate having a knuckle 14 at one end adapted to project beyond the end of the rim to which it is secured and to extend between the arms 5 and 6 of the lever 4 and register with the bearings or knuckles 10 and 11 thereof and through which the pintle 12 passes, whereby said lever is pivotally connected with said hinge member at a point spaced from its connection with the hinge member 1. The inner end of the member 13 is tapered to fit the crotch of the arms 5 and 6 and is beveled on its end and side edges of its outer face as shown at 15 to bear against and fit the beveled face of these arms when the lever is in closed position preventing its passage between said arms and thereby reinforcing the arms and preventing all danger of their becoming bent or distorted should excessive pressure be exerted by the tire on the rim at this point and also preventing any possibility of the tapered end of said member 13 passing between the arms 5 and 6. The bevel of this member 13 is widest at the end of the member and tapers toward its knuckle end to correspond with the beveled face of the lever 4. The knuckle end of said member 13 is adapted to swing freely between the arms of the lever to permit the free movement of said lever relative to said hinge member.

A catch or lever securing member 16 is pivoted to the rim R a sufficient distance from the hinge member 13 to engage the free end of the lever and lock it in closed position when the rim is expanded as is shown clearly in Figs. 2 and 3. The lever engaging end of said catch being off-set or socketed to receive said lever.

In the operation of this device, the parts being in the position shown in Fig. 2 and it is desired to remove the tire from the rim, the catch 16 is shifted to disengage it from the end of the lever 4 and said lever is swung inwardly on its fulcrum 3 which causes the end of the rim attached to the hinge member 13 to be swung inwardly and moved forwardly with said lever as shown clearly in Fig. 1, the hinge member being attached to the lever by the pintle 12. When in this position, it will be obvious that the rim will be retracted sufficiently to permit the ready removal of the tire. After another tire has been placed thereon and it is desired to expand or close the rim, the lever is swung in the opposite direction as shown by the arrow *a* thereby forcing the end of the rim connected with the hinge member 13 outwardly and bringing it into engagement with the end carrying the plate 1. When in this position the lever 4 is swung into engagement with the rim and the free end thereof secured by the latch 16.

From the above description, it will be obvious that a tire may be very quickly applied to or removed from the rim R by the operation of this lever 4 as above described.

I claim as my invention:

1. A split rim operating device comprising hinge members connected to the opposite ends of the rim and having knuckles on their opposed edges, an operating lever bifurcated at one end with each arm thereof provided with longitudinally spaced knuckles, the knuckles on one arm registering with those on the other and adapted to register with the knuckles on the hinge members, a pintle connecting the outer knuckle of said lever with the knuckle on one hinge member, a pintle connecting the inner knuckle of said lever with the knuckle of the other hinge member, the last mentioned hinge member being shaped to fit between the arms and in the crotch of said lever, said lever and hinge member having beveled overlapping meeting faces beyond the pivotal connection thereof, and means for locking said lever in closed position.

2. An operating device for split wheel rims comprising hinge members secured to the opposite ends of the rim, an operating lever, means connecting said lever with both of said hinge members at points spaced from each other, one of said hinge members and said lever having beveled meeting faces adapted to overlap and form reinforcing means and a limiting stop for the lever.

In testimony whereof I have hereunto set my hand in presence of two subscribing witnesses.

GEORGE WESLEY WOLF.

Witnesses:
W. F. PENN,
A. P. DULL.